(12) United States Patent
Chen

(10) Patent No.: US 10,767,834 B2
(45) Date of Patent: Sep. 8, 2020

(54) CONCEALED VEHICLE INDICIA

(71) Applicant: Ford Global Technologies, LLC, Dearborn, MI (US)

(72) Inventor: Linsheng Chen, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/200,753

(22) Filed: Nov. 27, 2018

(65) Prior Publication Data
US 2020/0166195 A1 May 28, 2020

(51) Int. Cl.
*B60Q 3/60* (2017.01)
*F21V 5/00* (2018.01)
*B60Q 3/20* (2017.01)
*B60Q 3/217* (2017.01)
*F21Y 115/30* (2016.01)

(52) U.S. Cl.
CPC ............... *F21V 5/003* (2013.01); *B60Q 3/60* (2017.02); *B60Q 3/20* (2017.02); *B60Q 3/217* (2017.02); *F21Y 2115/30* (2016.08)

(58) Field of Classification Search
CPC .. F21V 5/003; B60Q 3/60; B60Q 3/20; B60Q 3/217; B60Q 3/00; B60Q 3/10; B60Q 3/12; F21Y 2115/30; F21S 45/00; F21W 2106/00
See application file for complete search history.

(56) References Cited

U.S. PATENT DOCUMENTS

| 4,807,951 A | 2/1989 | Moss |
| 5,440,428 A * | 8/1995 | Hegg ..................... B60K 37/02 359/630 |
| 8,506,144 B2 | 8/2013 | Wang et al. |
| 9,809,161 B1 * | 11/2017 | Salter .................. G02B 27/425 |
| 2016/0238921 A1 | 8/2016 | Rossini et al. |
| 2018/0111570 A1 * | 4/2018 | Dellock ................. B60R 13/04 |

* cited by examiner

*Primary Examiner* — Bao Q Truong
(74) *Attorney, Agent, or Firm* — David Coppiellie; Price Heneveld LLP

(57) ABSTRACT

A vehicle includes a light source configured to emit light. A substrate defines a surface. The surface integrally defines an optical grating. A light transmissive layer is positioned over the optical grating. The light source is configured to direct the light through the light transmissive layer to the optical grating.

20 Claims, 5 Drawing Sheets

CONCEALED VEHICLE INDICIA

FIELD OF THE INVENTION

The present disclosure generally relates to indicia, and more particularly, to concealed indicia for vehicles.

BACKGROUND OF THE INVENTION

Often illuminated indicia in a vehicle must be projected onto a surface. The projection of the indicia must take into account the distance, curvature and angle of the surface to ensure that the projection is not distorted. Such features may complicate the projection and therefore increase manufacturing time and cost.

SUMMARY OF THE INVENTION

According to one feature of the present disclosure, a vehicle includes a light source configured to emit light. A substrate defines a surface. The surface integrally defines an optical grating. A light transmissive layer is positioned over the optical grating. The light source is configured to direct the light through the light transmissive layer to the optical grating.

According to another aspect of the present invention, a vehicle includes a substrate integrally defining an optical grating in a vehicle interior surface of the substrate. The optical grating defines at least one of a holographic grating and a diffraction grating. A light transmissive layer is positioned over the holographic grating of the vehicle interior surface of the substrate. A light source is configured to direct a collimated beam of light through the light transmissive layer to the holographic grating.

According to another aspect of the present invention, a vehicle includes a polymeric substrate integrally defining a holographic grating in a vehicle interior surface of the substrate. A light transmissive layer is positioned over the holographic grating of the vehicle interior surface. The light tranmissive layer comprises a polymeric material. A light source is configured to direct a light through the light transmissive layer to the optical grating.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
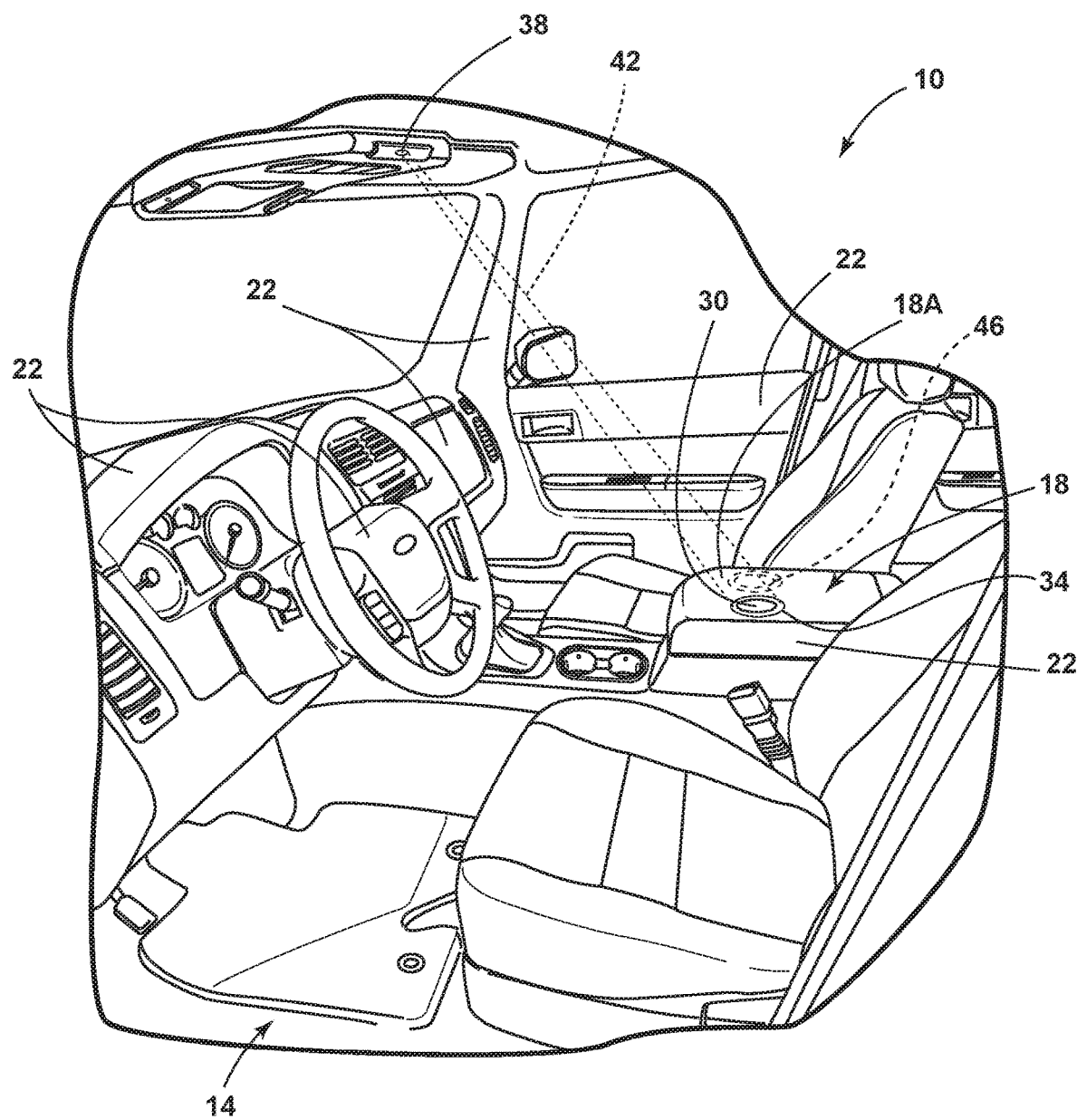
FIG. 1 is a perspective view of an interior of a vehicle, according to at least one example.

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims, as set forth below, are incorporated into and constitute part of this Detailed Description.

Figure 2:
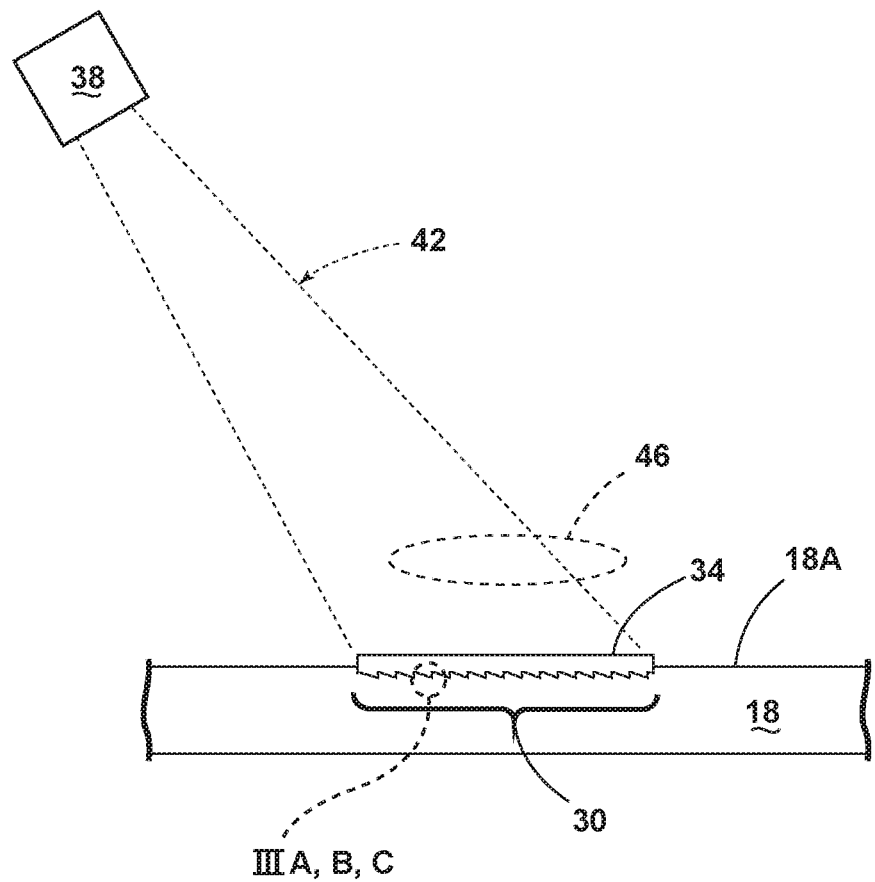
FIG. 2 is a schematic cross-section of the interior of the vehicle, according to at least one example.

Referring now to FIGS. 1 and 2, reference numeral 10 generally designates a vehicle having an interior 14 within which a substrate 18 is positioned. The substrate 18 may be coupled with, integrated within or otherwise positioned on a number of different vehicle components 22 positioned throughout the interior 14 of the vehicle 10. For example, the vehicle component 22 may include a center-console, overhead console, steering wheel, instrument cluster hood, an instrument panel, an A-pillar, a door, other features positioned around the vehicle 10 and/or combinations thereof.

The substrate 18 may be composed of a polymeric material, a metal, a composite material and/or combinations thereof. In polymeric examples, the substrate 18 may be composed of polyethylene terephthalate, orientated polypropylene, silicone, and/or polyvinyl chloride materials. The substrate 18 defines an interior surface 18A which is exposed to the interior 14 of the vehicle 10 and which is generally visible to the occupants of the interior 14. Conventionally, such an interior surface 18A may be referred to as an "A-surface." The interior surface 18A may be smooth, textured or otherwise shaped. As will be explained in greater detail below, the interior surface 18A may define one or more optical gratings 30.

A light transmissive layer 34 is positioned over the optical grating 30. The light transmissive layer 34 may include a polymeric material, a metalized layer, or other suitable material and is configured to control or modify an appearance of the interior surface 18A of the substrate 18. For example, the light transmissive layer 34 may be configured to conceal the optical grating 30. In various examples, the concealment of the optical grating 30 may be done by giving the appearance of an unbroken interior surface 18A. In other words, the light transmissive layer 34 may include the same color, texture, material and/or appearance as the interior surface 18A of the substrate 18 such that the presence of the light transmissive layer 34 and/or the optical grating 30 is not apparent. According to various examples, the light transmissive layer 34 may have a different appearance than the interior surface 18A (i.e., the light transmissive layer 34 may appear metallic while the interior surface 18A is polymeric) such that the light transmissive layer 34 is visible as an accent feature yet still conceals the optical grating 30. According to various examples, the light transmissive layer 34 is at least partially light transmissible such that light from a light source 38 may be able to pass through the light transmissive layer 34 and contact the optical grating 30.

The light source 38 is positioned in a spaced-apart relationship with the interior surface 18A of the substrate 18. The light source 38 may include incandescent bulbs, light-emitting diodes, electroluminescent elements, laser diodes, a light including a collimating lens or other type of light source 38 such that a collimated beam of light 42 is emitted from the light source 38 toward the light transmissive layer 34 and the optical grating 30. It will be understood that the vehicle 10 may include a plurality of light sources 38 positioned to emit separate collimated beams of light 42 toward the light transmissive layer 34. In examples including a plurality of light sources 38, the light sources 38 may be proximate one another or in a spaced apart configuration across the interior 14 of the vehicle 10. As will be explained in greater detail below, the use of multiple light sources 38 may provide different angles at which the collimated beams of light 42 may contact the optical grating 30. The light source 38 may be capable of emitting white, colored, nonvisible (e.g., ultraviolet and/or infrared), coherent and/or incoherent light. In examples where the vehicle 10 includes a plurality of light sources 38, each of the light sources 38 may be independently activated such that a variety of light patterns may be achieved. Further, each of the light sources 38 may emit a different type of light or have a different activation pattern. It will be understood that the light sources 38 may be optically coupled with one or more waveguides or light pipes such that the light may be transmitted to the optical grating 30 and/or light transmissive layer 34. The light source 38 may be positioned in a variety of locations around the vehicle 10. For example, the light source 38 may be couple to any of the above noted vehicle components 22. Further, more than one of the vehicle components 22 may include the light source 38 such that the optical grating 30 may be illuminated from a variety of directions. In examples of the vehicle 10 incorporating more than one light source 38, more than one optical grating 30 may be positioned across the interior 14 of the vehicle 10.

As explained above, the optical grating 30 is defined within the interior surface 18A of the substrate 18. The optical grating 30 may take a variety of configurations. For example, the optical grating 30 may include a holographic grating and/or a diffraction grating. Although described separately below for clarity, it will be understood that the optical grating 30 may include one or both of the holographic and diffraction gratings and that the substrate 18 may include a plurality of optical gratings 30 which are the same or different.

Referring now to FIG. 2, holographic examples of the optical grating 30 may include a plurality of features configured to form an interference pattern. The features of the holographic grating may be ridges, variations in opacity, density or surface profile. The collimated beam of light 42 from the light sources 38 falling on the interference pattern diffracts into a light field which forms a projected image 46. The projected image 46 may also be known as a hologram. The light field which forms the projected image 46 may exhibit visual depth queues such as parallax and perspective that change realistically with any change in the relative position of the observer (e.g., an occupant within the interior 14 of the vehicle 10). As the projected image 46 exhibits a depth and changes with changing perspective of the observer, the projected image 46 is a hologram. Use of examples of the vehicle 10 which incorporate multiple light sources 38 may be advantageous in providing a uniform appearance to the projected images 46 regardless of viewing perspective (e.g., driver seat vs. passenger seat) of the observer. In other words, a skewing of the projected image 46 based on the lighting may not occur, or be apparent to the viewer. Further, use of multiple light sources 38 may allow for the projected image 46 to change in intensity and/or color and may also simulate movement of the projected image 46 as described in greater detail below.

The projected image 46 may take a variety of configurations including alpha numeric text, symbols (e.g., vehicle make or model symbols, star pattern, etc.), as well as pictures. The projected image 46 may change color with a change in the color of the light sources 38. Further, the projected image 46 may appear different from different angles and embodiments utilizing differently oriented or differently colored light sources 38. For example, the intensity or color of the projected image 46 may vary based on the observer's seat position within the interior 14 of the vehicle 10. The intensity of the projected image 46 may be increased or decreased by a corresponding increase or decrease in light from one or more of the light sources 38. According to various embodiments, altering the activation of the light sources 38 may be configured to give the projected image 46 the appearance of movement. For example, by activating the light sources 38 in an alternating manner, the projected image 46 may be skewed in an alternating manner giving the appearance of movement. Further, a different projected image 46 may be formed by the activation of each light source 38 such that the projected image 46 appears to be moving around the substrate 18. It will be understood that more than one holographic grating may be utilized and that a light source for each holographic grating may be present such that the projected image 46 may appear to change or move based on which light source 38 is activated.

Figure 3A:
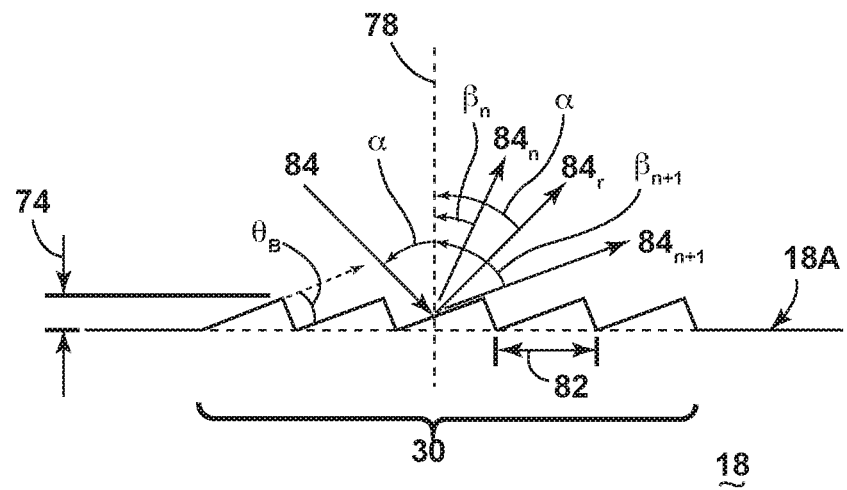
FIG. 3A is an enhanced view taken at section IIIA of FIG. 2, according to one embodiment.
Figure 3B:
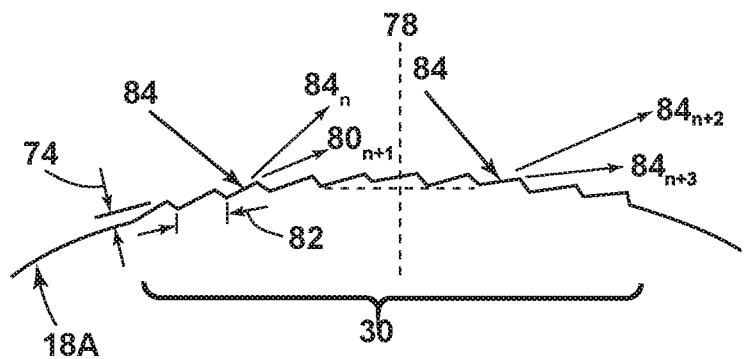
FIG. 3B is an enhanced view taken at section IIIB of FIG. 2, according to one embodiment.
Figure 3C:
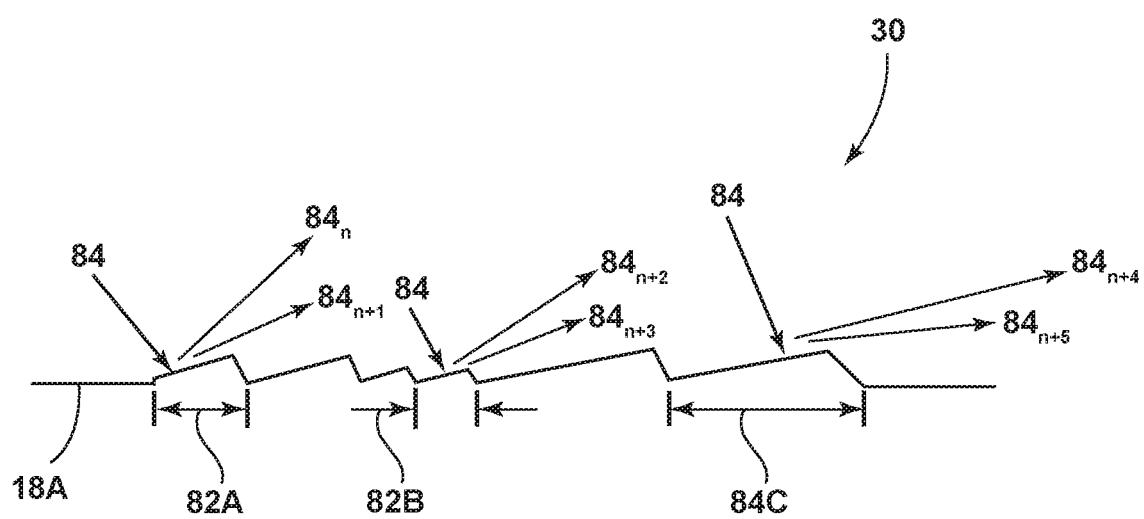
FIG. 3C is an enhanced view taken at section IIIC of FIG. 2, according to one embodiment.

Referring now to FIGS. 2-3C, diffraction grating examples of the optical grating 30 are configured to produce an iridescent pattern to the collimated beam of light 42 impinging upon it. Such a feature may be advantageous in providing a jewel-like appearance to the substrate 18. It will be understood that diffraction grating examples of the optical grating 30 may form of configurations including alpha numeric text, symbols (e.g., vehicle make or model symbols, star pattern, etc.), as well as pictures. The diffraction grating may be present on a flat examples of the substrate 18 (FIG. 3A), on a curved example of the substrate 18 (FIG. 3B), or on other shapes of the interior surface 18A of the surface 18A. For example, the diffraction grating example of the optical grating 30 may be configured to reflect light of different wavelengths in different directions. The diffraction grating may have a thickness 74 that ranges from about 250 nm to about 1000 nm. The thickness 74 of the diffraction grating, for example, should be maintained in the range of about 250 nm to about 1000 nm according to one embodiment to ensure that the substrate 18 exhibits a jewel-like appearance through light diffraction upon illumination in direct ambient lighting. The thickness 74 of the diffraction grating may range from about 390 nm to 700 nm. In other examples, the thickness 74 of the diffraction gratings ranges from 500 nm to 750 nm. As depicted in FIG. 3A in exemplary form, the diffraction grating may have a sawtooth or triangular shape. In three dimensions, these gratings can appear with a stepped or sawtooth shape without angular features, pyramidal in shape, or some combination of stepped and pyramidal shapes. Other shapes of the diffraction grating include hill-shaped features (e.g., sinusoidal or curved shaped features). The diffraction grating can also include portions with a combination of triangular and hill-shaped features. More generally, the shapes of the grating should be such that an effective blazing angle $\theta_B$ of at least 15 degrees is present for one or more portions of each grating, tooth or groove of the diffraction grating. The blaze angle $\theta_B$ is the angle between step normal (i.e., the direction normal to each step or tooth of the grating 30) and a direction normal 78 to the interior surface 18A of the substrate 18.

Generally, the blaze angle $\theta_B$ is optimized to maximize the efficiency of the wavelength(s) of the incident light which may be typical ambient sunlight, light from the light sources 38, to ensure that maximum optical power is concentrated in one or more diffraction orders while minimizing residual power in other orders (e.g., the zeroth order indicative of the ambient light itself). An advantage of situating the diffraction gratings on planar portions or aspects of the interior surface 18A of the substrate 18 is that a constant blaze angle $\theta_B$ and a period 82 will result in consistent reflected and diffracted light produced from the diffraction grating.

The diffraction grating examples of the optical grating 30 may be characterized by one or more periods 82 (also known as d in the standard nomenclature of diffraction gratings). In most aspects of the substrate 18, the period 82 of the diffraction grating is maintained between about 50 nm and about 5 microns. In general, the maximum wavelength that a given diffraction grating can diffract is equal to about twice the period 82. Hence, a diffraction grating with the period 82 that is maintained between about 50 nm and about 5 microns can diffract light in an optical range of 100 nm to about 10 microns. In a preferred embodiment, the period 82 of the diffraction grating is maintained from about 150 nm to about 400 nm, ensuring that the diffraction grating can efficiently diffract light in an optical range of about 300 nm to about 800 nm, roughly covering the visible spectrum.

Incident light 84, from the collimated beam of light 42, at an incident angle $\alpha$ is directed against a sawtooth-shaped diffraction grating having a thickness 74, a period 82 and a blaze angle $\theta_B$. More particularly, a portion of the incident light 84 (preferably, a small portion) striking the diffraction grating 30 at an incident angle $\alpha$ is reflected as reflected light $84_r$ at the same angle $\alpha$, and the remaining portion of the incident light 84 is diffracted at particular wavelengths corresponding to diffracted light $84_n$, $84_{n+1}$, etc., at corresponding diffraction angles $\beta n$, $\beta n+1$, etc. The reflected light $84_r$ is indicative of the zeroth order (i.e., n=0) and the diffracted light $84_n$, $84_{n+1}$, $84_{n+2}$ are indicative of the nth order diffraction according to standard diffraction grating terminology, where n is an integer corresponding to particular wavelengths of the reflected or diffracted light.

Referring now to FIG. 3C, an example of the diffraction grating example of the optical grating 30 employing varying periods (e.g., as including a set of periods) that can be employed in iridescent substrates 18 depicted in a cross-sectional form, according to an aspect of the disclosure. In the depicted example, the diffraction grating can have two or more sets of teeth or grooves, each having a particular period 82 that can produce light at unique or differing diffraction orders. As shown, the grating is configured with three periods—period 82A, period 82B, and period 82C. One set of teeth of the diffraction grating 30 with a period of 82A can produce diffracted light $84_n$ and $84_{n+1}$, a different set of teeth with a period of 82B can produce diffracted light $84_{n+2}$ and $84_{n+3}$, and a third set of teeth with a period of 82C can produce diffracted light $84_{n+4}$ and $84_{n+5}$, all from the same incident light 84.

The diffraction and holographic examples of the optical grating 30 may be formed into the substrate 18 in a variety of ways. For example, a chemical based laser may etch a mold, used for injection molding the substrate 18, with the optical grating 30. The material of the substrate 18 may flow into the etchings and thereby form the optical grating 30 on the substrate 18.

Figure 4:
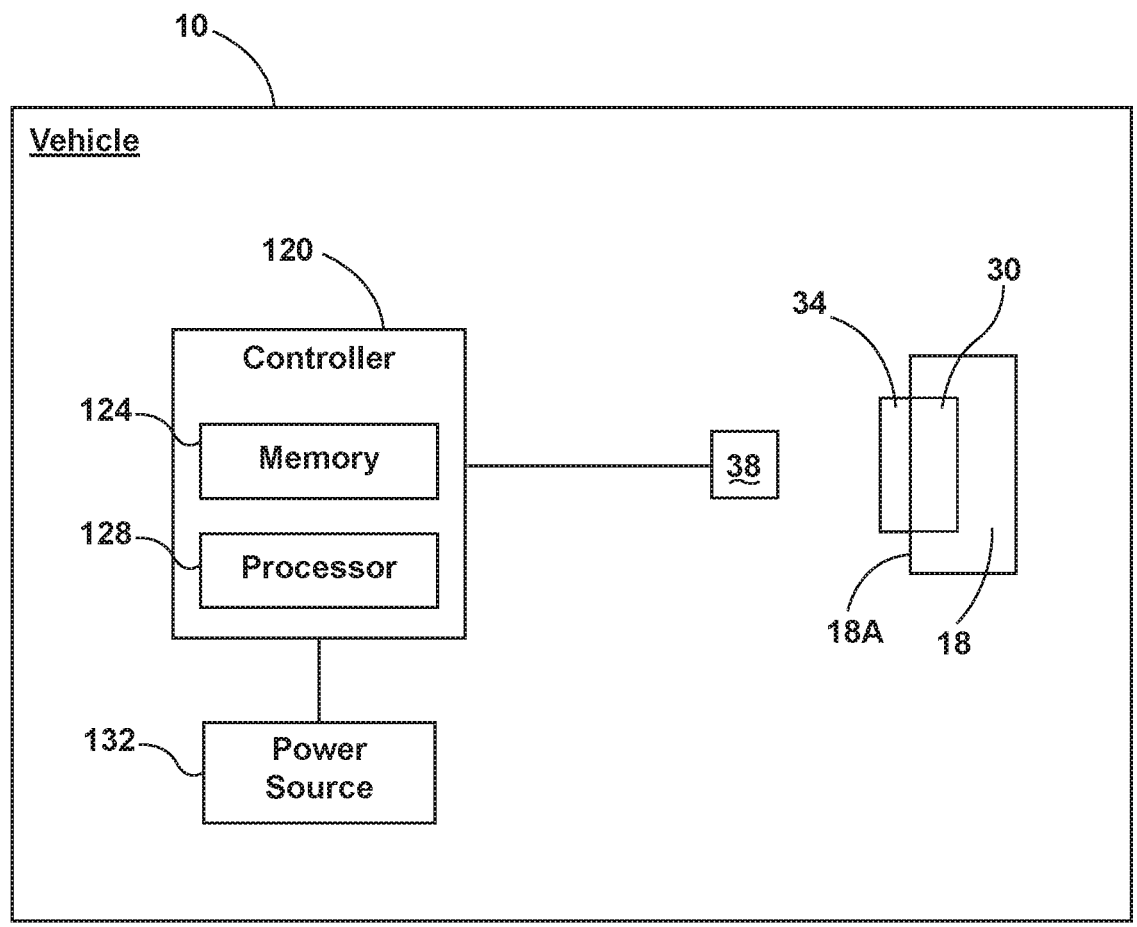
FIG. 4 is a block diagram of the vehicle, according to one embodiment.

Referring now to FIG. 4, a block diagram of the vehicle 10 is shown in which the substrate 18 is implemented. The vehicle 10 includes a controller 120 in communication with the light sources 38. The controller 120 may include a memory 124 having instructions contained therein executed by a processor 128 of the controller 120. The controller 120 may provide electrical power to the light sources 38 by a power source 132 located onboard the vehicle 10. The memory 124 may include a variety of routines configured to vary the color and intensity emitted by the light sources 38 that may be executed by the controller 120. For example, the light sources 34 may increase in brightness and/or change color to correspond with various vehicle events (e.g., welcome or farewell events, vehicle start, moving, stationary). In specific examples, the intensity of the light sources 38 may be altered relative to one another in order to make the projected image 46 appear to move or change color as explained above. Further, the intensity and/or color of the light sources 38 may be altered based on a user defined preference for ambient lighting in the interior 14 of the vehicle 10. In another example, the intensity of each of the light sources 38 may be set in a random order, and pulsed for a random amount of time to create a random sparkling appearance on the substrate 18.

According to various embodiments, a vehicle includes a light source configured to emit light, a substrate defining a surface, wherein the surface integrally defines an optical grating, and a light transmissive layer positioned over the optical grating, wherein the light source is configured to direct the light through the light transmissive layer to the optical grating. Embodiments of the vehicle wheel assembly can include any one or a combination of the following features:

the light transmissive layer comprises a polymeric material;
the light transmissive layer comprises a metallized layer;
the light source comprises a laser diode;
the light source comprises a collimating lens configured to collimate the light into a collimated light beam;
the optical grating comprises a holographic grating;
the optical grating comprises a diffraction grating;
the optical grating defines an indicium;
the substrate defines a plurality of optical gratings;
the substrate is positioned on a center console of a vehicle;
the substrate is positioned within an instrument panel of the vehicle; and/or
the light transmissive layer is configured to conceal the holographic grating.

What is claimed is:

1. A vehicle, comprising:
A plurality of light sources configured to emit light, the plurality of light sources spaced across an interior of the vehicle;
a vehicle trim component spaced from the plurality of light sources, the vehicle trim component including a substrate defining a surface, wherein the surface integrally defines an optical grating; and
a light transmissive layer positioned over the optical grating, the light transmissive layer configured to conceal the optical grating such that the optical grating is not apparent, wherein the plurality of light sources are configured to direct the light across the interior and through the light transmissive layer to the optical grating.

2. The vehicle of claim 1, wherein the light transmissive layer comprises a polymeric material.

3. The vehicle of claim 1, wherein the light transmissive layer comprises a metallized layer.

4. The vehicle of claim 1, wherein the plurality of light sources comprise a laser diode.

5. The vehicle of claim 1, wherein the plurality of light sources comprise a collimating lens configured to collimate the light into a collimated light beam.

6. The vehicle of claim 1, wherein the optical grating comprises a holographic grating.

7. The vehicle of claim 1, wherein the optical grating comprises a diffraction grating.

8. The vehicle of claim 1, wherein the optical grating defines an indicium.

9. The vehicle of claim 1, wherein the substrate defines a plurality of optical gratings.

10. The vehicle of claim 1, wherein the substrate is positioned on a center console of a vehicle and the light transmissive layer includes at least one of a same color, texture, or appearance as a portion of the center console free of the optical grating.

11. The vehicle of claim 1, wherein the substrate is positioned within an instrument panel of the vehicle.

12. A vehicle, comprising:
a cabin defining an interior;
a vehicle trim component including a substrate, the substrate integrally defining an optical grating in a vehicle interior surface of the substrate, wherein the optical grating defines at least one of a holographic grating and a diffraction grating;
a light transmissive layer positioned over the holographic grating of the vehicle interior surface of the substrate, the light transmissive layer configured to conceal the optical grating such that the optical grating is inconspicuous; and
a plurality of light sources spaced across the interior of the vehicle from the vehicle trim component, the plurality of light sources configured to direct collimated beams of light across the interior and through the light transmissive layer to the holographic grating.

13. The vehicle of claim 12, wherein the light transmissive layer comprises a polymeric material.

14. The vehicle of claim 12, wherein the light transmissive layer is configured to provide a same appearance as a portion of the vehicle interior surface free of the optical grating.

15. The vehicle of claim 12, wherein the holographic grating defines an indicium.

16. A vehicle, comprising:
a cabin defining an interior;
a vehicle trim component including a polymeric substrate integrally defining a holographic grating in a vehicle interior surface of the substrate;
a light transmissive layer positioned over the holographic grating of the vehicle interior surface, wherein the light transmissive layer comprises a polymeric material configured to conceal the holographic grating such that vehicle interior surface includes an unbroken appearance; and
a light source spaced across the interior of the vehicle from the vehicle trim component, the light source configured to direct a light across the interior and through the light transmissive layer to the holographic grating.

17. The vehicle of claim 16, wherein the substrate defines a plurality of holographic gratings.

18. The vehicle of claim 16, wherein the light source comprises a laser diode.

19. The vehicle of claim 16, wherein the light source comprises a collimating lens configured to collimate the light into a collimated light beam.

20. The vehicle of claim 16, wherein the substrate is positioned on a center console of a vehicle and the light transmissive layer includes at least one of a same color or texture as the vehicle interior surface of the substrate.

\* \* \* \* \*